(12) United States Patent
I'Anson

(10) Patent No.: US 8,024,270 B2
(45) Date of Patent: Sep. 20, 2011

(54) OPERATING A COMMUNICATIONS INFRASTRUCTURE ON A PRE-PAYMENT BASIS

(75) Inventor: Colin I'Anson, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 3333 days.

(21) Appl. No.: 10/275,871

(22) PCT Filed: May 8, 2001

(86) PCT No.: PCT/GB01/01989
§ 371 (c)(1),
(2), (4) Date: Nov. 7, 2002

(87) PCT Pub. No.: WO01/86933
PCT Pub. Date: Nov. 15, 2001

(65) Prior Publication Data
US 2003/0120595 A1   Jun. 26, 2003

(30) Foreign Application Priority Data
May 10, 2000   (GB) .................................. 0011171.6

(51) Int. Cl.
*G06Q 40/00*   (2006.01)
(52) U.S. Cl. ................. 705/40; 705/39; 705/41; 705/44
(58) Field of Classification Search .............. 705/39–41, 705/44
See application file for complete search history.

(56) References Cited

U.S. PATENT DOCUMENTS

| 5,027,388 A | * | 6/1991 | Bradshaw et al. ......... 379/114.1 |
| 5,233,642 A | * | 8/1993 | Renton ......................... 455/405 |
| 5,659,601 A | * | 8/1997 | Cheslog ................... 379/121.02 |
| 5,684,861 A | * | 11/1997 | Lewis et al. .................... 455/405 |
| 5,696,902 A | * | 12/1997 | Leclercq et al. ................ 705/40 |
| 5,826,198 A | * | 10/1998 | Bergins et al. ................ 455/557 |
| 5,870,672 A | * | 2/1999 | Stoddard et al. .............. 455/410 |
| 5,875,236 A | * | 2/1999 | Jankowitz et al. ....... 379/114.24 |
| 5,915,214 A | * | 6/1999 | Reece et al. ................. 455/406 |

(Continued)

FOREIGN PATENT DOCUMENTS

EP   0 917 337 A1   5/1999

(Continued)

OTHER PUBLICATIONS

Pirot, J., "Implementation of Value-Added Services in an Internet Environment," *Alcatel Telecommunications Review*, 4th Quarter, pp. 268-273 (1997).

*Primary Examiner* — Mary Cheung
*Assistant Examiner* — Daniel L Greene, Jr.

(57) ABSTRACT

Subscribers to a communications infrastructure, such as a GPRS network, can pre-pay for use of metered resources of the infrastructure. When a pre-payment subscriber joins the network, the current credit amount for the subscriber is distributed as credit values between user-specific virtual purses each associated with a respective metered resource. Upon use of a metered resource by the subscriber, the credit value held in the associated purse is correspondingly reduced, with use of the resource being dependent on the purse being in credit. The virtual purses are preferably electronically distributed to be close by the metered resources to which they relate whereby to reduce network billing traffic. When the subscriber leaves the network, the remaining credit values are consolidated from the purses.

22 Claims, 2 Drawing Sheets

U.S. PATENT DOCUMENTS 6,047,051 A * 4/2000 Ginzboorg et al. .......... 379/130

FOREIGN PATENT DOCUMENTS

| | | | |
|---|---|---|---|
| GB | 2332337 A * | 6/1990 | |
| GB | 2 332 337 A | 6/1999 | |
| WO | 97/26739 | 7/1997 | |
| WO | 99/30480 | 6/1999 | |
| WO | 99/65183 | 12/1999 | |
| WO | 00/05871 | 2/2000 | |
| WO | WO 00/05871 * | 2/2000 | |
| WO | 00/79741 A1 | 12/2000 | |

* cited by examiner

OPERATING A COMMUNICATIONS INFRASTRUCTURE ON A PRE-PAYMENT BASIS

FIELD OF THE INVENTION

The present invention relates to a method of operating a communications infrastructure on a pre-payment basis and in particular, but not exclusively, to the operation of a GPRS network on a pre-payment basis. The present invention also relates to communication infrastructures adapted to operate on a prepayment basis.

BACKGROUND OF THE INVENTION

Communication infrastructures suitable for mobile users (in particular though not exclusively, cellular radio infrastructures have now become widely adopted. Whilst the primary driver has been mobile telephony, the desire to implement mobile data-based services over these in infrastructures, has led to the rapid development of data-capable bearer services across such infrastructures. This has opened up the possibility of many Internet-based services being available to mobile users.

By way of example, FIG. 1 shows one form of known communication infrastructure for mobile users providing both telephony and data-bearer services. In this example, a mobile entity 20, provide with a radio subsystem 22 and a phone subsystem 23, communicates with the fixed infrastructure of GSM (Global System for Mobile communications) PLMN (Public Land Mobile Network) 10 to provide basic voice telephony services. In addition, the mobile entity 20 includes a data-handling subsystem 25 interworking, via data interface 24, with the radio subsystem 22 for the transmission and reception of data over a data-capable bearer service provided by the PLMN; the data-capable bearer service enables the mobile entity 20 to communicate with a service system 40 connected to the public Internet 39. The data handling subsystem 25 supports an operating environment 26 in which applications run, the operating environment including an appropriate communications stack.

More particularly, the fixed infrastructure 10 of the GSM PLMN comprises one or more Base Station Subsystems (BSS) 11 and a Network and Switching Subsystem NSS 12. Each BSS 11 comprises a Base Station Controller (BSC) 14 controlling multiple Base Transceiver Stations (BTS) 13 each associated with a respective "cell" of the radio network. When active, the radio subsystem 22 of the mobile entity 20 communicates via a radio link with the BTS 13 of the cell in which the mobile entity is currently located. As regards the NSS 12, this comprises one or more Mobile Switching Centers (MSC) 15 together with other elements such as Visitor Location Registers 32 and Home Location Register 32.

When the mobile entity 20 is used to make a normal telephone call, a traffic circuit for carrying digitised voice is set up through the relevant BSS 11 to the NSS 12 which is then responsible for routing the call to the target phone (whether in the same PLMN or in another network).

With respect to data transmission to/from the mobile entity 20, in the present example three different data-capable bearer services are depicted though other possibilities exist. A first data-capable bearer service is available in the form of a Circuit Switched Data (CSD) service; in this case a full traffic circuit is used for carrying data and the MSC 32 routes the circuit to an InterWorking Function IWF 34 the precise nature of which depends on what is connected to the other side of the IWF. Thus, IWF could be configured to provide direct access to the public Internet 39 (that is, provide functionality similar to an IAP—Internet Access Provider IAP). Alternatively, the IWF could simply be a modem connecting to a PSTN; in this case, Internet access can be achieved by connection across the PSTN to a standard IAP.

A second, low bandwidth, data-capable bearer service is available through use of the Short Message Service that passes data carried in signalling channel slots to an SMS unit which can be arranged to provide connectivity to the public Internet 39.

A third data-capable bearer service is provided in the form of GPRS (General Packet Radio Service which enables IP (or X.25) packet data to be passed from the data handling system of the mobile entity 20, via the data interface 24, radio subsystem 21 and relevant BSS 11, to a GPRS network 17 of the PLMN 10 (and vice versa). The GPRS network 17 includes a SGSN (Serving GPRS Support Node) 18 interfacing BSC 14 with the network 17, and a GGSN (Gateway GPRS Support Node) interfacing the network 17 with an external network (in this example, the public Internet 39). Full details of GPRS can be found in the ETSI (European Telecommunications Standards Institute) GSM 03.60 specification. Using GPRS, the mobile entity 20 can exchange packet data via the BSS 11 and GPRS network 17 with entities connected to the public Internet 39.

The data connection between the PLMN 10 and the Internet 39 will generally be through a firewall 35 with proxy and/or gateway functionality.

Different data-capable bearer services to those described above may be provided, the described services being simply examples of what is possible.

In FIG. 1, a service system 40 is shown connected to the Internet 40, this service system being accessible to the OS/application 26 running in the mobile entity by use of any of the data-capable bearer services described above. The data-capable bearer services could equally provide access to a service system that is with in the domain of the PLMN operator or is connected to another public or private data network.

With regard to the OS/application software 26 running in the data handling subsystem 25 of the mobile entity 20, this could, for example, be a WAP application running on top of a WAP stack where "WAP" is the Wireless Application Protocol standard. Details of WAP can be found, for example, in the book "Official Wireless Application Protocol" Wireless Application Protocol Forum, Ltd published 1999 Wiley Computer Publishing. Where the OS/application software is WAP compliant, the firewall will generally also serve as a WAP proxy and gateway. Of course, OS/application 26 can comprise other functionality (for example, an e-mail client) instead of, or additional to, the WAP functionality.

The mobile entity 20 may take many different forms. For example, it could be two separate units such as a mobile phone (providing elements 22-24) and a mobile PC (data-handling system 25) coupled by an appropriate link (wireline, infrared or even short range radio system such as Bluetooth). Alternatively, mobile entity 20 could be a single unit such as a mobile phone with WAP functionality. Of course, if only data transmission/reception is required (and not voice), the phone functionality 24 can be omitted; an example of this is a PDA with built-in GSM data-capable functionality whilst another example is a digital camera (the data-handling subsystem) also with built-in GSM data-capable functionality enabling the upload of digital images from the camera to a storage server.

Whilst the above description has been given with reference to a PLMN based on GSM technology, it will be appreciated that many other cellular radio technologies exist and can typically provide the same type of functionality as described for the GSM PLAN 10.

Recently, much interest has been shown in "location-aware" services for mobile users, these being services that take account of the current location of the user (or other mobile party). A number of different ways exist for determining the location of a mobile entity and FIG. 1 depicts the case of location determination being done in the network (for example, by making Timing Advance measurements for three BTSs 13 and using these measurements to derive location) with the resultant location data being passed to a location server 37 from where it can be made available to the mobile entity concerned and authorised services. Typically, location determination is only done when a location request is received at the location server, the latter then being responsible for initiating location determination and providing the result to the requesting entity. The location server 37 can be connected as a resource accessible via the GPRS network 17.

It is known to pre-pay for use of PLMN resources (typically voice traffic and SMS services) with the subscriber being centrally credited with an amount corresponding to their prepayment; this initial credit amount is decremented according to the subscriber's use of the PLMN resources until no more credit exists at which time provision of services is suspended. The subscriber can replenish their credit amount by making additional payments generally at any time either before or after the initial credit amount has been used up. The use of network resources is tracked at key points (typically the MSC) which generate billing records for billable events, these records being passed back to the central accounting system where they are matched against the subscriber—if the subscriber is on a pre-payment scheme, the current credit amount is then adjusted according to the billing records. The reduction in credit will depend not only on how long a particular resource (e.g. voice traffic circuit) has been used, but also on factors such as time of day and quality of service.

"WO 00/05871 discloses a prepaid system and method for permitting a prepaid subscriber of a cellular wireless telecommunication system to revise call features during a call to debit the subscribers prepaid account on a real-time basis. The prepaid administrative network, in response to real-time call event messages received from call event generation means, revises an initial charge debiting rate to generate a real-time debiting rate used during the call to reduce the prepaid service credit balance."

"GB-A-2 332 337 discloses a service centre for a telecommunications system in which a subscribed is allocated particular usage amounts in different usage categories. The usage categories of calls made by the subscriber are then monitored and the calls charged at the rates appropriate for the categories concerned; in addition, the remaining usage amounts available in each category are adjusted accordingly. If a subscriber exceeds the amount of usage available to that subscriber in a particular category, the subscriber is charged at an excess call charge rate."

Current implementations of pre-payment systems lack flexibility and responsiveness and it is an object of the present invention to provide an improved pre-payment method and system

SUMMARY OF THE INVENTION

According to the present invention, there is provided a method of operating a communications infrastructure having a plurality of metered resources, the method involving:

recording pre-payment of an amount by a user for use of the metered resources;

distributing at least a portion of said amount as credit values held in respective ones of a plurality of user-specific virtual purses each one of which is associated with a respective one of said plurality of metered resources; and upon use of a metered resource by the user, correspondingly reducing the credit value held in the associated purse, with use of the resource being dependent on the credit value in the purse being above a pre-determined threshold (typically zero but possibly a positive or negative figure).

The virtual purses are preferably located at or close to their associated resources; however, it is also possible to locate all the purses centrally.

As used herein the term "metered resource" means any infrastructure element or service the use of which is a billable event.

According to another aspect of the present invention, there is provided a communications infrastructure comprising:

a plurality of metered resources, a respective purse subsystem associated with each metered resource for providing user-specific virtual purses for that resource;

a pre-payment system for recording pre-payment of an amount by a user for use of the metered resources, the pre-payment system including a distribution arrangement for distributing at least a portion of said amount as credit values to respective ones of a plurality of virtual purses each associated with that user and each held by a respective one of the purse subsystems, and a respective usage-control arrangement associated with each metered resource and operative to permit use of that resource by a user only when the credit value in the user's purse for that resource is above a predetermined threshold, the purse subsystem associated with the resource being operative to reduce the credit value held in the user's purse in accordance with usage of the resource by that user.

BRIEF DESCRIPTION OF THE DRAWINGS

A method and system, both embodying the present invention, for operating a communications infrastructure on a pre-payment basis, will now be described, by way of non-limiting example, with reference to the accompanying diagrammatic drawings, in which.

BEST MODE OF CARRYING OUT THE INVENTION

Figure 1:
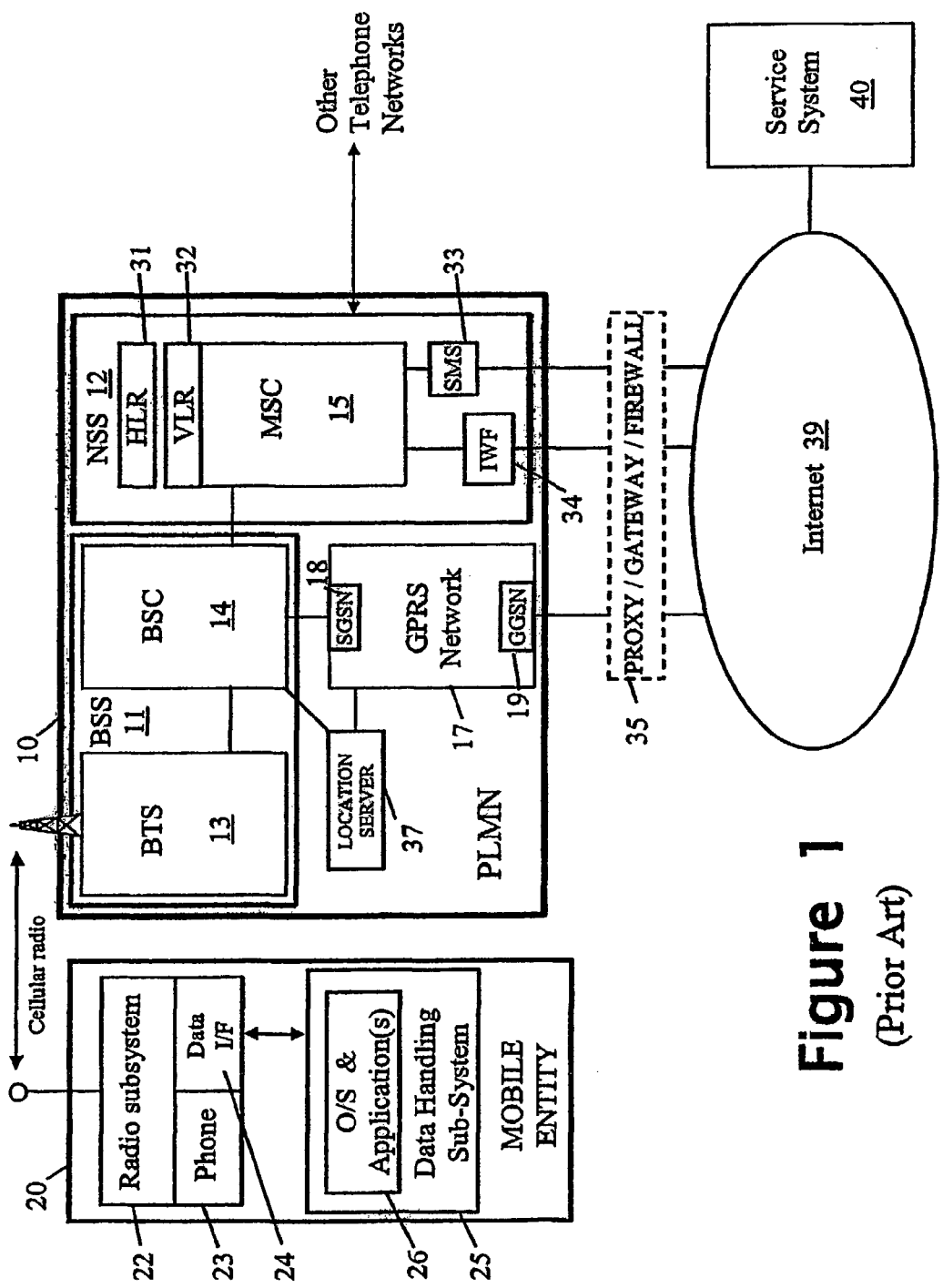
FIG. 1 is a diagram of a known communications infrastructure usable for transferring voice and data to/from a mobile entity.

The present invention is described hereinafter in relation to pre-paid usage of particular resources of the GPRS network 17 of the FIG. 1 system, this GPRS network being shown in more detail in FIG. 2 along with a pre-payment system 60. For simplicity, no description is given as to how a user pays for use of the PLMN 10 other than GPRS network 17, it being possible to use any appropriate charging mechanism for such use (including the pre-payment mechanism to be described below in relation to the GPRS network).

Figure 2:
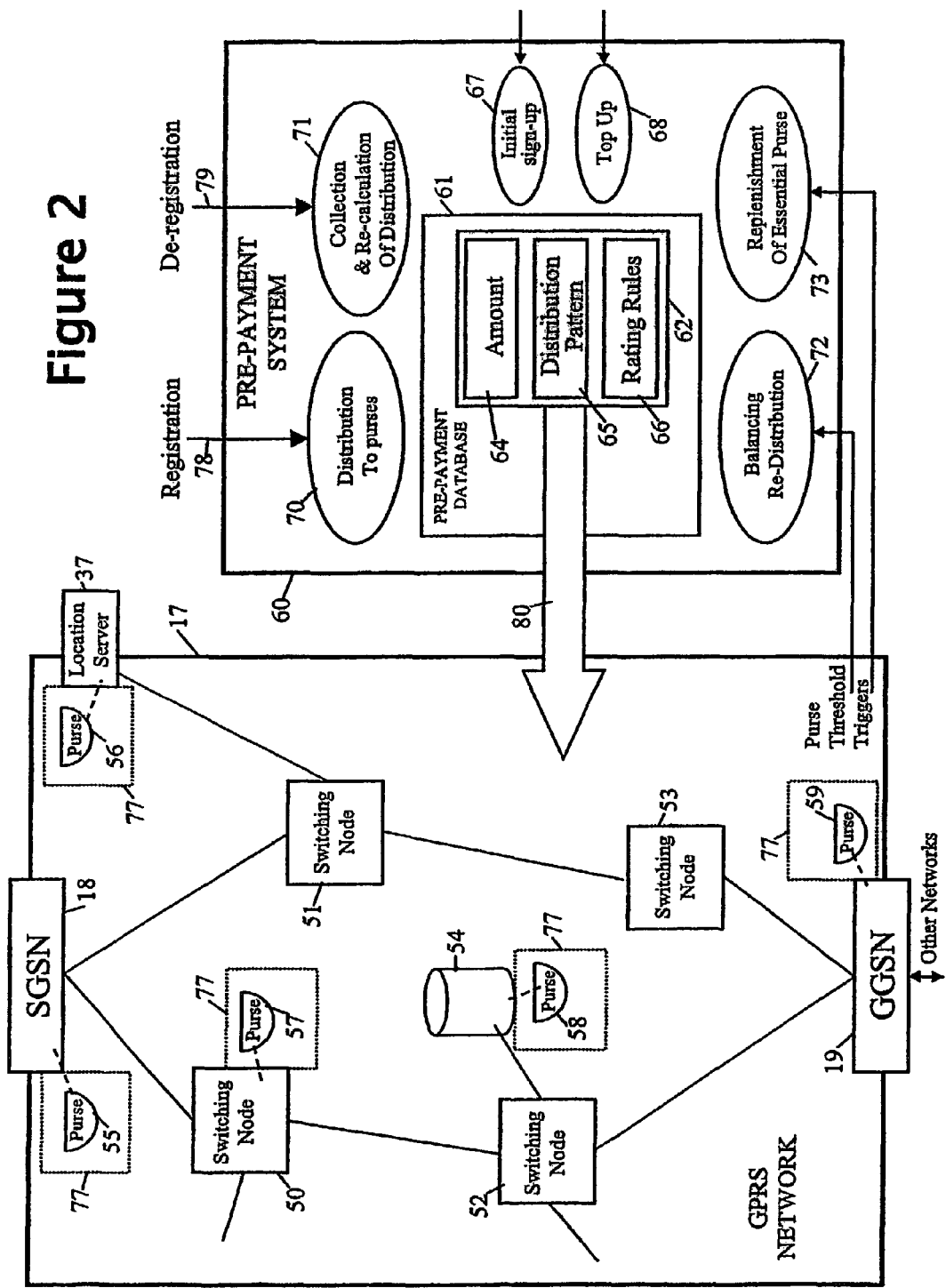
FIG. 2 is a diagram illustrating the operation of a GPRS network of the FIG. 1 communications infrastructure on a pre-payment basis.

As shown in FIG. 2, the GPRS network 17 comprises, in addition to the SGSN node 18 and GGSN node 19, switching nodes 50 to 53. Connected to switching node 52 is a database resource 54 (for example, a directory resource) whilst the location server 37 is connected to switching node 51. The nodes 18, 19, 50, the database 54 and the location server 57 each constitute a metered resource, that is, use of the resource is a billable event and results in the generation of a billing record. Associated with each metered resource is a purse sub-system 77 for holding user-specific virtual purses; each the purse subsystem is, for example, embodied as software running on the same processor as the metered resource or on an associated processor local to the resource whereby communication of billing events from the metered resource to the associated purse system is local and does not consume GPRS network resources.

The pre-payment system 60 is a central facility for PLMN 10 and is used for administering pre-payment tariff customers. The system 60 has a pre-payment database 61 holding a respective record 62 for each pre-payment customer. This record holds the current credit amount 64 attributed to each pre-payment customer, the amount being initially set upon initial sign-up of a customer through sign-up process 67 and being subsequently replenished using top-up process 68.

User record 62 also holds a distribution pattern specifying how the credit amount is to be allocated between metered resources, this distribution being in terms of the relative values between the metered resources—for example, the relative values may be specified to be:

| | |
|---|---|
| Node 18: | 10 |
| Node 19: | 10 |
| Node 50: | 5 |
| Database 54: | 5 |
| Location Server 37: | 8 |

The distribution pattern can be initially set to a default pattern reflecting average usage by all users or can be set according to a pattern specified by the user. Preferably, the initial pattern is subsequently modified to reflect the actual pattern of usage by the user concerned. Of course, since different resources will generally be differently priced, the distribution pattern will generally reflect not only how often a resource is used but also its relative cost compared to the other resources.

The record 62 for each user also contains rating rule information that specifies or indicates the charging rates to be applied by each resource for the user concerned. These charging rates will generally be time of day dependent and quality-of-service dependent. The rating rule information need only indicate an appropriate scale to be used where the charging rates are organised in scales that are known to the purse sub-systems 77.

In the present arrangement, when a pre-payment user is first recorded as present in the PLMN (registered with the HLR), a "registration" indicator is passed to the pre-payment system from the HLR (arrow 78). This initiates a process 70 that distributes (arrow 80) the credit amount 64 specified in the user's record 62 to user-specific virtual purses 55-59 that are created as needed in the purse sub-system 77 associated with the metered resources 18, 19, 50, 54, 37, The credit amount 64 is distributed between purses according to the distribution pattern 65 for that user. At the same time, rating rule information for the user is passed to the purse sub-systems 77. The whole of the amount 64 can be distributed at one go; alternatively, a limit can be set as to the maximum amount that can be distributed to the purses.

Thereafter, at each usage of a metered resource by the user, a billing record is generated and passed to the corresponding purse sub-system where the credit value is reduced by an amount dependent on the resource usage and appropriate charging rate as set by the rating rule information. Continued usage of a metered resource is dependent on there being sufficient credit value in the corresponding purse, that is, the credit value being above a predetermined threshold, typically zero but possibly either a positive value (e.g. a value equal to the minimum usage amount for the resource concerned) or a negative value (where a degree of debt is permitted).

When a user ceases to be present in the PLMN (that is, is de-registered in the HLR), a "de-registration" indicator (arrow 79) is passed to the pre-payment system 60, triggering a process 71. Process 71 collects the remaining credit values from the user's purses (which are thereupon destroyed) and consolidates these values into a remaining amount which replaces the previous credit amount 64 in record 62. At the same time, process 71 re-calculates an appropriate distribution pattern for the user, taking account of the resource usage made during the last session of use, this new pattern replacing the previous pattern in record 62. The billing records showing the usage made of each resource are consolidated at each purse subsystem and passed from there to an accounting system (not shown).

In the event that the user tops up their credit amount whilst registered (that is, whilst the previous credit of the user is distributed between the purses), the top-up amount is temporarily held in record 62 and then added on to the consolidated remaining amount derived by process 71.

The triggering of processes 70 and 71 can be from "presence" events more immediate to the use of GPRS network that the mere registration/de-registration of the user with the HLR Thus, the distribution process 70 could be triggered off the user initiating a connection with the PLMN or, even more specifically, upon the user seeking to use the GPRS network; similarly, process 71 can be triggered off connection termination or cessation of use of the GPRS network.

A number of different procedures can be used to compensate for the depletion of edit values in the virtual purses whilst a user is present and the credit amount 64 is distributed between the purses. Thus, for example, where only part of the amount 64 was initially distributed, when the credit value in a particular purse falls below a certain level, the purse can request that it be replenished from the withheld amount.

Another replenishment mechanism involves a re-distribution of the remaining credit values held in the purses to re-establish the initial distribution pattern (or to establish a new pattern that takes account of the latest relative usage of the resources)—see process 72. Process 72 can be triggered, for example, by one of the purses falling below a particular level and/or by expiration of a set time interval.

Yet another replenishment mechanism, suitable as a last resort involves designating certain of the metered resources as more important than others; in this case, a purse associated with a more important resource will be replenished when reaching a threshold low level from a purse associated with a less important resource (process 73).

Whilst in the above-described arrangement the purses 55-59 have been located at or adjacent the corresponding metered resources, it would also be possible to locate the purses within the pre-payment system itself though this has the drawback of increasing time-critical billing traffic since now billing records must be passed to the pre-payment system.

It will be appreciated that the GPRS network can simultaneously be used by subscribers who are not on a pre-payment tariff.

It will also be understood that the above-described method and system can be applied to the operation of other communication infrastructures and are not limited to use with GPRS networks.

Furthermore, where the communications infrastructure comprises a plurality of networks each with metered resources, and the user can only be present in only one network at a time, a user's credit can be distributed to the network where the user currently is and then, when the user leaves that network, the remaining credit value can be collected back ready for re-distributing in the network where the user is next present.

It may also be desirable to provide a mechanism for calling back or drawing down the credit amounts in the purses when the user incurs a charge in relation to some other chargeable event not associated with the usage of the metered resources.

The metered resources can simply be perimeter nodes of the network subject to pre-payment usage—whilst this does not fully meter usage of internal resources it does catch traffic moving across the network boundaries.

Where the communications infrastructure is a PLMN, both mobile originating and mobile terminated traffic can be subject to the above-described pre-payment mechanism.

The invention claimed is:

1. A method of operating a communications infrastructure having a plurality of metered resources, the method involving:
   recording pre-payment of an amount by a user for use of the metered resources;
   distributing at least a portion of said amount as credit values held in respective ones of a plurality of user-specific virtual purses each one of which is associated with a respective one of said plurality of metered resources; and
   upon use of a metered resource by the user, correspondingly reducing the credit value held in the associated purse, with use of the resource being dependent on the credit value in the purse being above a predetermined threshold.

2. A method according to claim 1, wherein the virtual purses are located at their respective associated metered resources.

3. A method according to claim 1, wherein the distribution of credit values to the virtual purses is effected upon the user being determined as present in relation to the communications infrastructure, the remaining credit values in the purses being re-consolidated to a remaining amount upon the user ceasing to be present.

4. A method according to claim 1, wherein the distribution of credit values to the virtual purses is effected according to a given pattern of relative values between the purses.

5. A method according to claim 4, wherein said given pattern is determined according to the user's relative usage of the metered resources over a preceding period.

6. A method according to claim 1, wherein charge rate information is distributed with the credit values whereby to enable the reduction of credit values to be effected according to a charging rate applicable to the user and usage.

7. A method according to claim 1, wherein following an initial distribution of credit values to the virtual purses, a sum remains, this sum being at least partially subsequently distributed to replenish one or more of the purses following a depletion as a result of usage of the corresponding resource.

8. A method according to claim 1, wherein the credit values held in said purses are redistributed to a given pattern of relative values in at least one of the following circumstances, the credit value in one of the purses falling below a particular level; on time out of a predetermined period.

9. A method according to claim 8, wherein said given pattern is determined taking account of the user's relative usage of the metered resources over the immediately preceding period of usage.

10. A method according to claim 8, wherein certain of said resources are designated as more important than others, a purse associated with a more important resource being replenished when reaching a threshold low level from a purse associated with a less important resource.

11. A method according to claim 1, wherein the communications infrastructure comprises a plurality of networks each with metered resources, the user being present in only one said network at a time and the steps of credit-value distribution and reduction being effected only in relation to resources of the network where the user is present, the credit values remaining after usage of that network being consolidated to a remaining amount upon the user ceasing to be present in a network whereby that remaining amount is available for distribution upon the user becoming present again in a said network.

12. A communications infrastructure comprising:
   a plurality of metered resources,
   a respective purse subsystem associated with each metered resource for providing user-specific virtual purses for that resource;
   a pre-payment system for recording pre-payment of an amount by a user for use of the metered resources, the pre-payment system including a distribution arrangement for distributing at least a portion of said amount as credit values to respective ones of a plurality of virtual purses each associated with that user and each held by a respective one of the purse subsystems, and
   a respective usage-control arrangement associated with each metered resource and operative to permit use of that resource by a user only when the credit value in the user's purse for that resource is above a predetermined threshold, the purse subsystem associated with the resource being operative to reduce the credit value held in the user's purse in accordance with usage of the resource by that user.

13. An infrastructure according to claim 12, wherein the purse subsystems and the usage-control arrangements are located at their respective associated metered resources.

14. An infrastructure according to claim 12, further comprising a presence-detection system for detecting when a user is present to the communications infrastructure, the pre-payment system being operative to distribute credit values to the virtual purses upon the user being determined as present by said presence-detection system, and the pre-payment system being further operative, upon the user ceasing to be present as determined by the presence-detection system, to re-consolidate the remaining credit values in the purses to a remaining amount in the pre-payment system.

15. An infrastructure according to claim 12, wherein the pre-payment system is operative to distribute credit values to the virtual purses according to a given pattern of relative values between the purses.

16. An infrastructure according to claim 15, wherein said given pattern is determined according to the user's relative usage of the metered resources over a preceding period.

17. An infrastructure according to claim 12, wherein the pre-payment system is operative to distribute charge rate information with the credit values whereby to enable the reduction of credit values to be effected according to a charging rate applicable to the user and usage.

18. An infrastructure according to claim 12, wherein the pre-payment system is operative initially to distribute only part of said amount as credit values to the virtual purses thereby leaving an initial undistributed sum, the pre-payment system being further operative to distributed at least some of the undistributed sum to replenish one or more of the purses following a depletion by the corresponding usage-control arrangement as a result of usage of the corresponding resource.

19. An infrastructure according to claim 12, wherein the pre-payment system is operative to re-distribute the credit values held in said purses to a given pattern of relative values in at least one of the following circumstances: the credit value in one of the purses falling below a particular level; on time out of a predetermined period.

20. An infrastructure according to claim 19, wherein said given pattern is determined taking account of the user's relative usage of the metered resources over the immediately preceding period of usage.

21. An infrastructure according to claim 19, wherein certain of said resources are designated as more important than others, a purse associated with a designated more important resource being replenished when reaching a threshold low level from a purse associated with a less important resource.

22. An infrastructure according to claim 12, comprising a plurality of networks each with metered resources, and a presence detection system for determining when a user is present in one of the networks, the pre-payment system being operative to distribute said amount only in relation to resources of the network where the user is present, with the credit values remaining after usage of that network being consolidated to a remaining amount in the pre-payment system upon the user ceasing to be present in a network whereby that remaining amount is available for distribution upon the user becoming present again in a said network.

* * * * *

UNITED STATES PATENT AND TRADEMARK OFFICE
CERTIFICATE OF CORRECTION

PATENT NO.        : 8,024,270 B2
APPLICATION NO.   : 10/275871
DATED             : September 20, 2011
INVENTOR(S)       : Colin I'Anson It is certified that error appears in the above-identified patent and that said Letters Patent is hereby corrected as shown below:

In column 8, line 3, in Claim 8, delete "circumstances," and insert -- circumstances: --, therefor.

Signed and Sealed this
Thirty-first Day of July, 2012

David J. Kappos
*Director of the United States Patent and Trademark Office*